United States Patent
Karagiannis et al.

(10) Patent No.: US 10,120,669 B2
(45) Date of Patent: Nov. 6, 2018

(54) SYSTEM AND METHOD FOR DEPLOYING APPLICATION COMPONENTS ON DISTRIBUTED IT RESOURCES

(71) Applicant: NEC Europe Ltd., Heidelberg (DE)

(72) Inventors: Vasileios Karagiannis, Patras (GR); Apostolos Papageorgiou, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 15/453,932

(22) Filed: Mar. 9, 2017

(65) Prior Publication Data
US 2018/0260200 A1    Sep. 13, 2018

(51) Int. Cl.
*G06F 9/445* (2018.01)
*H04L 12/24* (2006.01)
*H04L 29/08* (2006.01)
*G06F 8/60* (2018.01)

(52) U.S. Cl.
CPC ............ *G06F 8/60* (2013.01); *H04L 41/5022* (2013.01); *H04L 67/10* (2013.01)

(58) Field of Classification Search
CPC ........ G06F 8/60; H04L 41/5022; H04L 67/10
See application file for complete search history.

(56) References Cited

U.S. PATENT DOCUMENTS

| | | | |
|---|---|---|---|
| 6,522,995 B1 * | 2/2003 | Conti | G06F 11/3414 702/183 |
| 7,028,290 B2 * | 4/2006 | Srivastava | G06F 11/3676 712/227 |
| 7,047,463 B1 * | 5/2006 | Organ | G01R 31/2834 714/51 |
| 7,552,361 B2 * | 6/2009 | Galler | G06F 11/3684 714/38.1 |
| 9,558,104 B2 * | 1/2017 | Rajamanickam | G06F 11/3676 |

(Continued)

OTHER PUBLICATIONS

Mansoor Alicherry, et al., "Network Aware Resource Allocation in Distributed Clouds", INFOCOM, 2012 Proceedings IEEE, Mar. 25-30, 2012, pp. 963-971.

(Continued)

*Primary Examiner* — Viva Miller
(74) *Attorney, Agent, or Firm* — Leydig, Voit & Mayer, Ltd.

(57) ABSTRACT

A method for deploying application components to Information Technology (IT) resources using an application platform controller includes requesting a network slice for the application components from a network controller. Priority values are assigned to the application components defining an order in which the application components are planned to be deployed. A deployment plan is computed for the application components. The network slice is reconfigured based on a determination that no deployment plan which meets the requirements is possible using the requested network slice. The application components are deployed sequentially, using the priority values, to host sites of the IT resources using information from the network controller including existing registrations of users of the application to an access network of the host sites such that replicas of the application components are provided at the host sites which provide a minimum latency with respect to a location of the users.

13 Claims, 7 Drawing Sheets

(56) References Cited

U.S. PATENT DOCUMENTS

| | | | | |
|---|---|---|---|---|
| 9,753,845 | B1* | 9/2017 | van Schaik | G06F 11/3608 |
| 2009/0144698 | A1* | 6/2009 | Fanning | G06F 8/75 |
| | | | | 717/120 |
| 2009/0265693 | A1* | 10/2009 | Bakowski | G06F 11/3688 |
| | | | | 717/131 |
| 2009/0265694 | A1* | 10/2009 | Bakowski | G06F 11/3676 |
| | | | | 717/131 |
| 2015/0220426 | A1* | 8/2015 | Spektor | G06F 11/36 |
| | | | | 717/131 |

OTHER PUBLICATIONS

Jussi Kangasharju, et al., "Object Replication Strategies in Content Distribution Networks", Computer Communications, vol. 25, Dec. 2002, pp. 376-383.

* cited by examiner

SYSTEM AND METHOD FOR DEPLOYING APPLICATION COMPONENTS ON DISTRIBUTED IT RESOURCES

FIELD

The present invention relates to a system and a method for deploying application components on distributed Information Technology (IT) resources based on interactions between the application platform controller and network-layer controllers. The system and the method are particularly applicable to an Internet of Things (IoT) platform.

BACKGROUND

Typically, large distributed applications are executed and managed by an application platform, which handles multiple applications. The application platform provides for the control of deployment options and placement decisions of application components on the IT infrastructure. For example, it receives packaged customer applications for deployment and can apply techniques such as:
1. Application component replication and placement,
2. Application component migration,
3. Prioritization of applications or application requirements, and
4. Application data quality/quantity level configuration (if configurable)

An IoT platform is an application platform which performs the aforementioned tasks on an IT infrastructure which includes edge as well as loud hosts in order to integrate and handle data and users that potentially do not only come from (or use) computers, but also mobile or embedded units with limited processing and communication capabilities. An IoT platform typically involves various further functionalities, which are not the subject of the present invention. Edge hosts refer to hosts that are co-located with either gateway devices (in fixed/broadband networks) or base stations (in mobile/3GPP networks) to which the end users connect directly ("one hop"), typically leading to user-to-edge latencies that are much lower than user-to-Cloud latencies.

Various approaches have appeared for optimizing (individually or jointly) the control parameters managed by the application (or IoT) platform, typically focusing around application component placement or virtual machine placement and being based on diverse optimization goals.

Kangasharju, Jussi, et al., "Object replication strategies in content distribution networks," Computer Communications 25, no. 4, pp. 376-383 (2002) describe the problem of optimally replicating objects and deploying them in content distribution networks (across a network model that is based on the actual internet architecture). The problem is formulated as a decision problem and the optimization goal is set to finding the nodes to store the objects such that the average number of inter-node hops that a request must traverse from a client to an object is minimized. The average number of hops is chosen as an indicator of user latency. Along with the problem formulation, heuristics which are based on random, popularity and greedy algorithms are proposed to approximate the optimal solution.

Similarly, Alicherry, Mansoor, et al., "Network aware resource allocation in distributed clouds," In Infocom, 2012 proceedings IEEE, pp. 963-971 (2012) study the problem of resource allocation in distributed clouds. The problem is formulated as selecting the data centers for virtual machine placement such that the maximum latency between any two of the chosen data centers is minimized. The infrastructure of data centers is considered as a graph with vertices that represent data centers and edges that represent the physical links among the nodes. The aim is set to finding the sub-graph of the initial network graph that achieves the optimization goal. Along with the problem formulation, a heuristic that is based on the clique problem of the graph theory is also proposed.

SUMMARY

Embodiments of the present invention provide a system and a method with which an application/IoT platform enriches an application component deployment optimization procedure by integrating interactions with network layer controllers, thus leading to deployments that can achieve a better fulfillment of application requirements.

In an embodiment, the present invention provides a method for deploying application components to IT resources using an application platform controller includes receiving the application components and a Service Level Agreement (SLA) including requirements of each of the application components for an application to be deployed. A network slice for the application components is requested from a network controller. Priority values are assigned to the application components defining an order in which the application components are planned to be deployed. A deployment plan is computed for the application components, wherein the network controller is notified and the network slice is reconfigured based on a determination that no deployment plan which meets the requirements is possible using the requested network slice. The application components are deployed sequentially, using the priority values, to host sites of the IT resources using information from the network controller including existing registrations of users of the application to an access network of the host sites such that replicas of each respective one of the application components are provided at the host sites which provide a minimum latency with respect to a location of the users.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized that while the known approaches do make some assumptions about the lower layers (e.g., available hardware resources and their characteristics, network links, etc.), they practically solve the problem (i.e., try to achieve their optimization goals) in isolation from the control possibilities of the lower layers. More concretely:
1. The approaches are based on a system that assumes a given and static network graph (i.e., IT resources and network links) on which the applications can run.
2. The approaches do not recognize that the problems solved by optimizing application deployment could be often tackled with lower costs by tweaking other control parameters either of the application platform or of other layers.

Therefore, current approaches treat the application deployment problem as a self-contained optimization problem, which they solve in a "best-effort" manner, or in other words, they are oriented towards finding solutions that get as close as possible to satisfying application requirements using the currently available resources.

As used herein, a hosting system consists of host sites that can be either cloud sites or edge sites. An edge site is a computing center close to the network edge allowing short delays between the end user and the first component deployed on the edge site. A cloud site is a computing center located closer to the center of the network.

Figure 1:
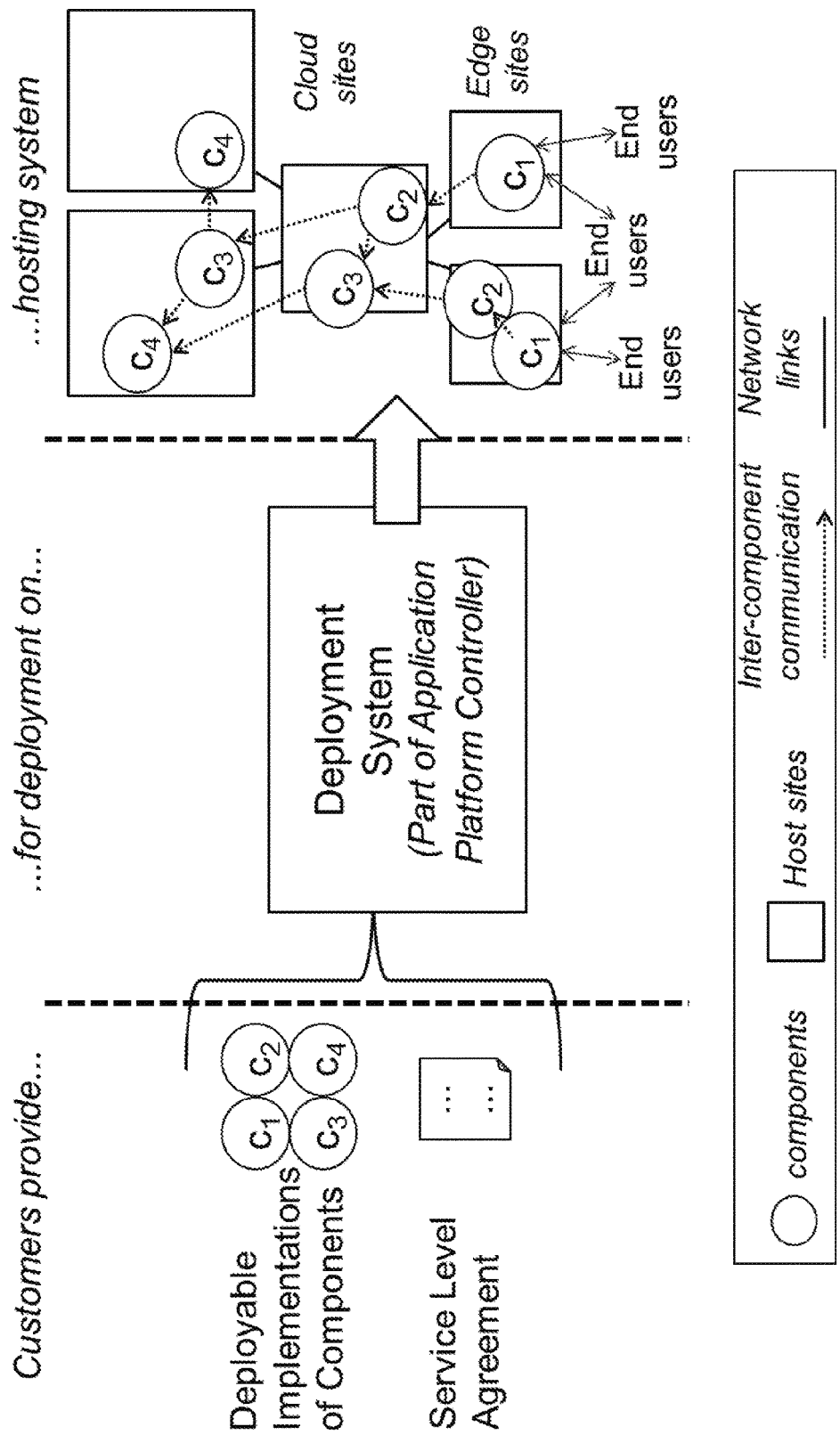
FIG. 1 is a schematic overview of an application deployment on a hosting platform.

FIG. 1 illustrates the scope of the deployment problem, with the deployment plan being one of the main control actions that an application/IoT platform controller is charged with. Customers (e.g., application providers that want to deploy their applications using the application platform according to embodiments of the invention provide deployable implementations of the components $C_1$-$C_4$ of the application and typically an SLA to a deployment system of the application platform controller. The application is deployed onto IT resources at the hosting system, preferably consisting of Cloud sites and edge sites connected to each other by network links. The components $C_1$-$C_4$ distributed on these IT resources of the hosting system communicate with each other via an inter-component communication using the network links between the sites in the network slice. The end users are for example, a smartphone, tablet, computer, etc.

Figure 5:
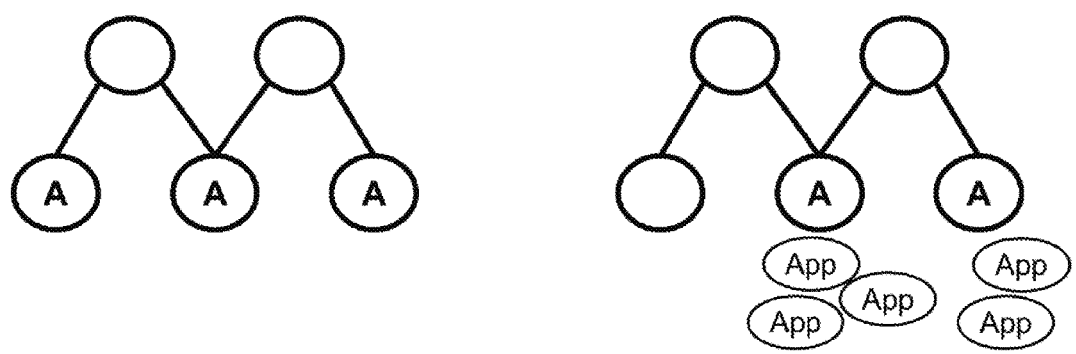
FIG. 5 shows a first exemplary deployment step/scenario for the networks 1 and 2 of FIG. 4.
Figure 6:
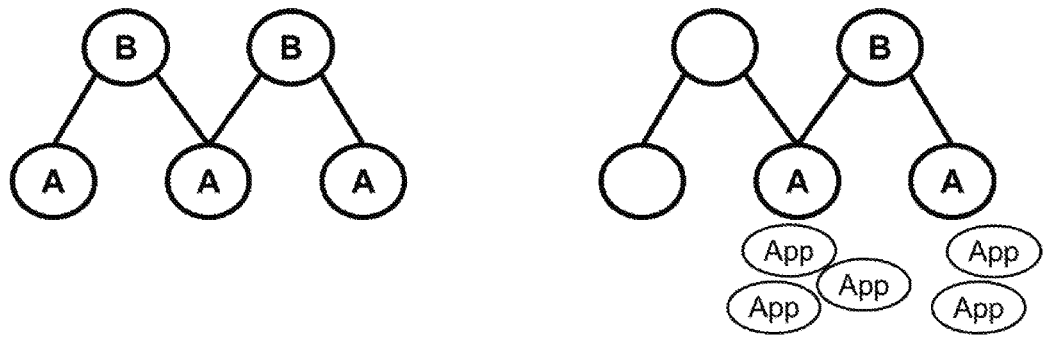
FIG. 6 shows a second exemplary deployment step/scenario for the networks 1 and 2 of FIG. 4.
Figure 7:
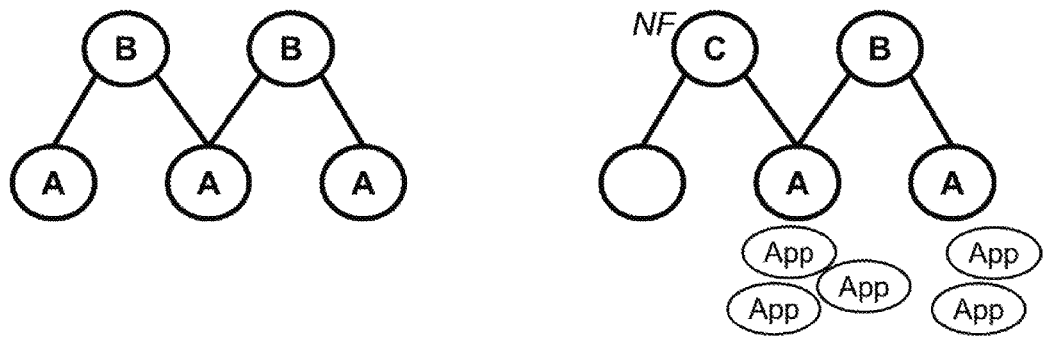
FIG. 7 shows a third exemplary deployment step/scenario for the networks 1 and 2 of FIG. 4.
Figure 8:
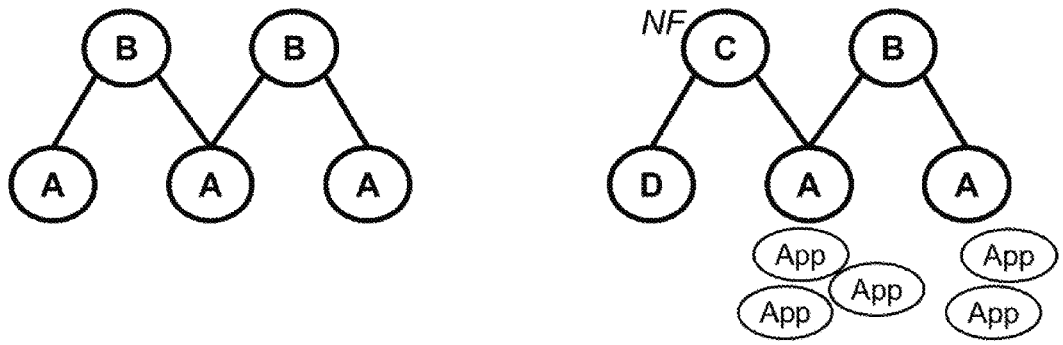
FIG. 8 shows a fourth exemplary deployment step/scenario for the networks 1 and 2 of FIG. 4.
Figure 9:
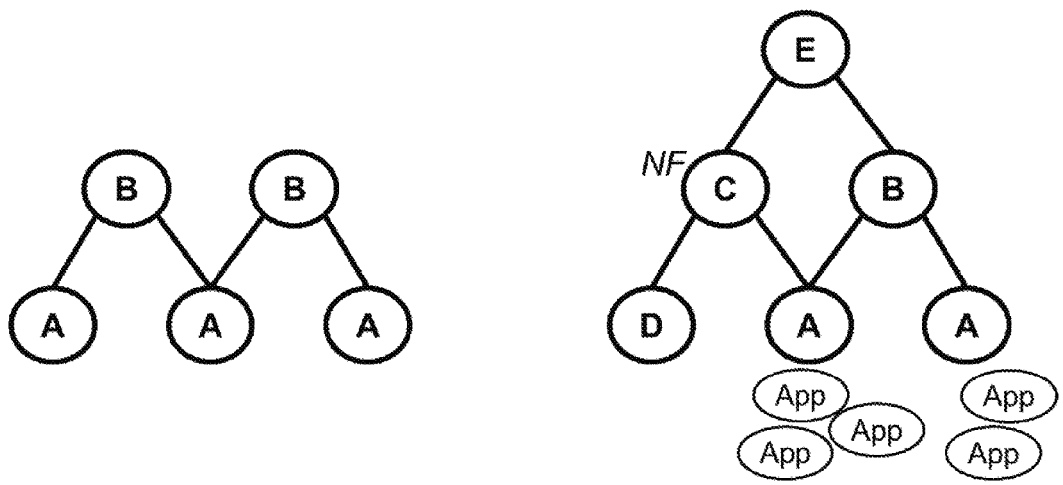
FIG. 9 shows a fifth exemplary deployment step/scenario for the networks 1 and 2 of FIG. 4.

In contrast to the known approaches, an embodiment of the present invention utilizes dynamic network management and network/IT slicing to provide that the application/IoT platforms are able to increase their chances to satisfy application requirements by having a deployment optimization system that is aware of the fact that other layers can help them satisfy application requirements. By so doing, benefits are provided for both the application/IoT platform provider (who can satisfy application requirements of their customers) and the network operator (who becomes a more important business partner for the application/IoT platform provider). Moreover, improvements to the functioning of the computer system itself, including the application platform controller, for deploying the applications are effected in that:
1. A higher degree of fulfillment of application requirements by utilizing controls from other layers.
2. A reduction, or elimination altogether, of requirements violations can be achieved by utilizing the control actions of other layers.
3. A more effective use of IT resources is achieved through the multi-layer cooperation by occupying less nodes, thereby saving resources and increasing computational power capabilities, as illustrated in FIGS. 5 and 6 below.
4. Deployment of components which would not be otherwise be possible can be achieved through the multi-layer cooperation, as illustrated in FIGS. 7-9 discussed below.
5. Latency is reduced because the deployment takes place as close as possible to the component's requirements.

According to an embodiment, the deployment optimization components of the application/IoT platform can interact with controllers of other layers and are aware of the fact that control actions of those layers can be performed to help satisfy the requirements of the applications to be deployed. This embodiment differs from known approaches, for example, in that:
1. An internal architecture of the deployment optimization system is different in that it includes components and sequences that are tailored to cooperative multi-layer control.
2. A deployment optimization logic, including an optimization problem and a heuristic for solving it, are different to any related approach in that prioritized application components are deployed until their requirements are satisfied, considering the ability to request network slice updates if lower priority components are expected to require it.

While an alternative solution would be to use a centralized controller, which optimizes the application deployment jointly with the control parameters of the network controllers (e.g., assignment of network resources to applications, configuration of access network parameters such as traffic prioritization, bandwidth allocation, etc.), such an approach would have three main disadvantages:
1. The application layer and the network layer are often controlled by different providers, thus leading to larger business and integration related costs.
2. The optimization problem of the centralized controller would contain so many control parameters (with dynamic, loose, or unknown relationships and correlations) that an optimization problem involving all of them would be very difficult to design and potentially inefficient in practice.
3. The different controllers have (time-wise) different control loops, e.g., access network controllers have much shorter control cycles than others.

Figure 2:
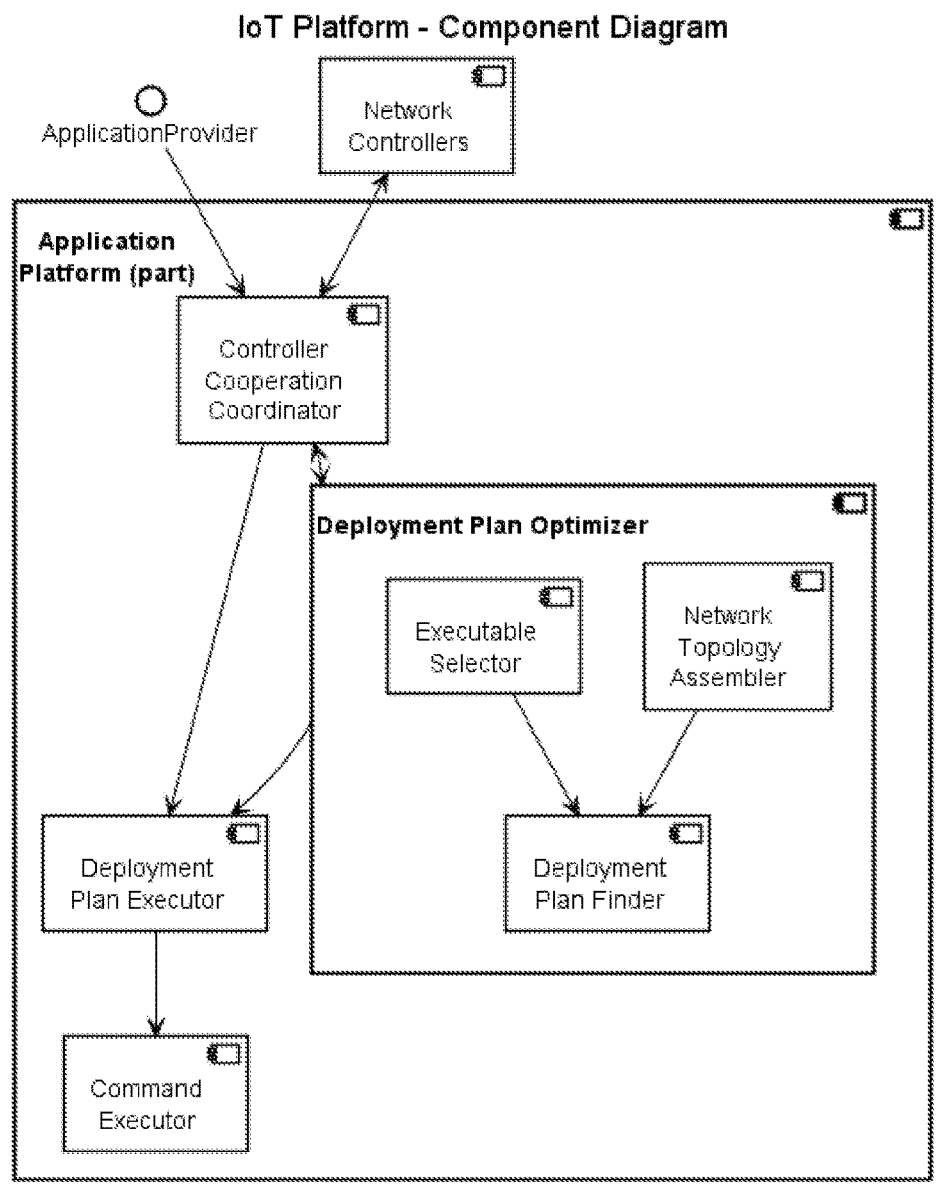
FIG. 2 is a schematic component diagram of an application platform that implements a multi-layer-aware application component deployment.

FIG. 2 schematically illustrates the architecture of a system implementing an application component deployment according to an embodiment of the present invention, which includes the following components:
1. Controller Cooperation Coordinator: Responsible for sending/receiving requests and general information to/from the other network controllers. Moreover, it serves as the northbound of the application platform. Examples of its use are:
   i) Application-specific network slice negotiation.
   ii) Send/receive application-related reconfiguration requests that have been computed to improve overall performance (e.g., application migrations, resource adjustments, etc.).
   iii) Receive requirement violations (bandwidth, throughput, etc.) detected from the other network controllers (in layers that are not visible to the IoT platform).
2. Deployment Plan Optimizer: Receives as input the network slice of an application, all the application components (also referred to as executables), and an SLA, including application requirements, between the application provider and the network operator. Its purpose is to compute a solution (also referred to as a deployment plan) to deploy the application components on remote computing nodes of the network. To achieve its goal, the Deployment Plan Optimizer employs the following components:
  i) Network Topology Assembler: Provides a layer of abstraction between the network controller that assigns resources to the network slice and the Deployment Plan Finder. More specifically, it receives the network slice in a representation created by another network controller and converts that into a format that is compatible with the optimization algorithms of the deployment Plan Finder.
  ii) Executable Selector: Decides on the amount of executables that require deployment or re-deployment based on the input of the Controller Cooperation Coordinator.
  iii) Deployment Plan Finder: A main component of the Deployment Plan Optimizer which includes the algorithms to compute an optimized solution of deploying all the application components.
3. Deployment Plan Executor: Receives the deployment plan of an application placement that is pending or independent requests of executables that need reconfiguration (e.g., deploy more instances or resize the executable-specific reserved resources) and translates into properly formatted commands that can be executed by the Command Executor.
4. Command Executor: Manages and configures remote Cloud computing environments. Its purpose is to receive commands related to the deployment of applications and execute them over the actual infrastructure, preferably by managing Virtual Machine (VM) images, containers, or any other form of packaged software modules.

Figure 3A:
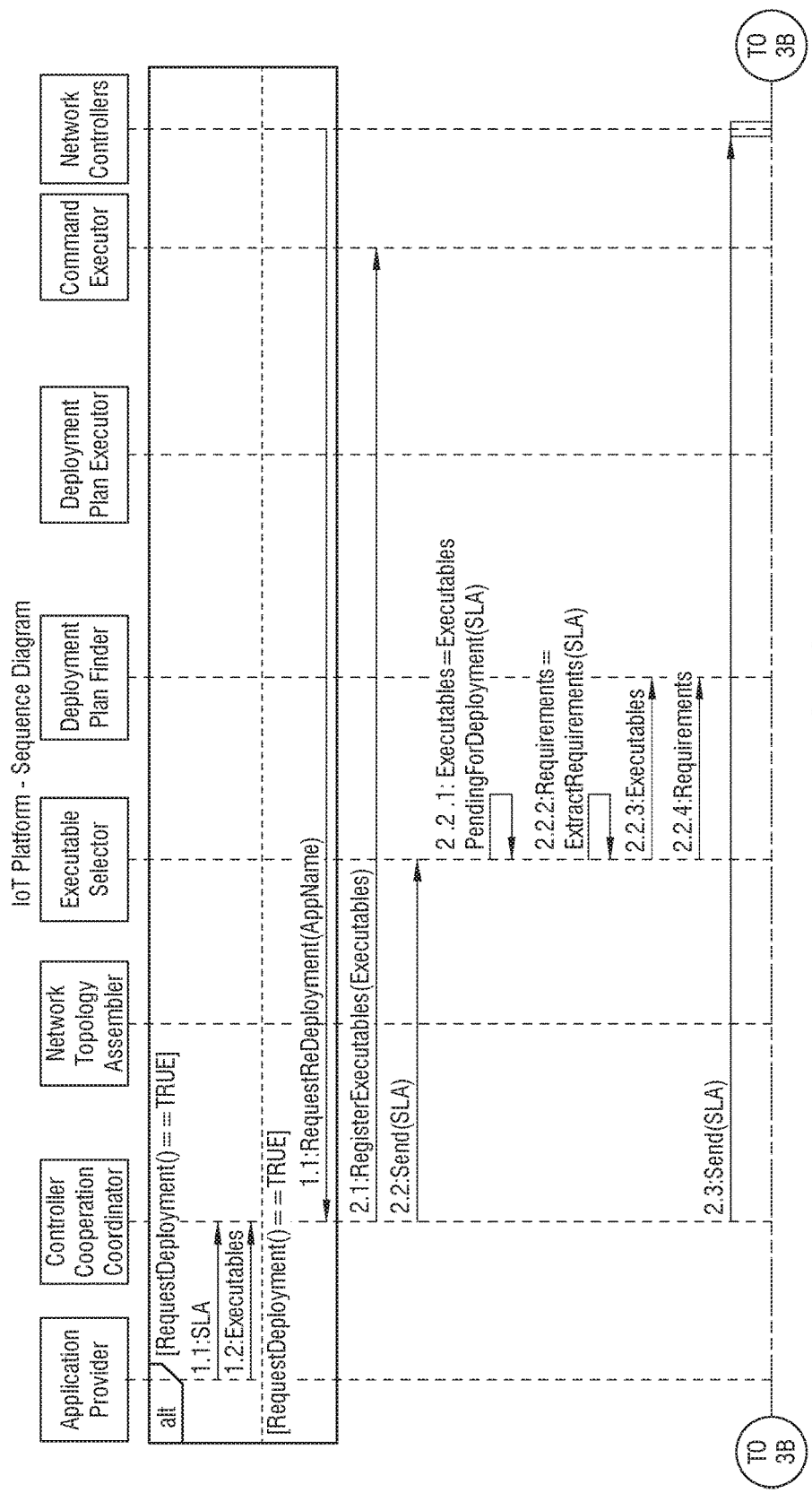
FIGS. 3A and 3B are a sequence diagram for the multi-layer-aware application component deployment.
Figure 3B:
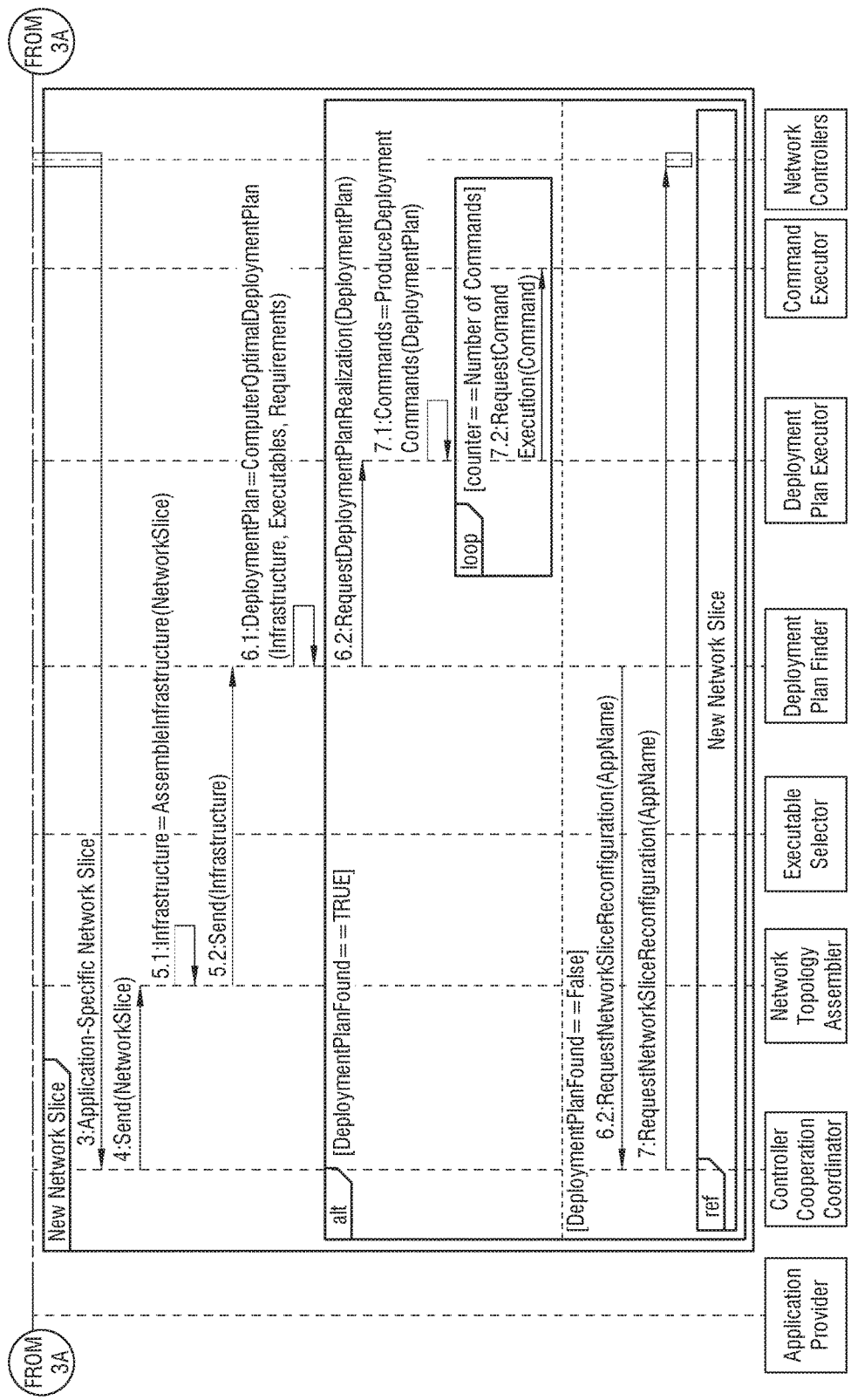

The interactions and steps that take place among the deployment optimization components of the application/IoT platform in order to realize the multi-layer-aware deployment optimization are shown in FIGS. 3A and 3B. According to an embodiment, the application platform operation method involves the following main steps:
1. The Controller Cooperation Coordinator, after receiving a deployment request including the executables and an SLA (1.1, 1.2) from an application provider or from one of the network controllers (re-deployment in case of a violation of the requirements detected from the other controllers), sends the application SLA to the Executable Selector of the Deployment Plan Optimizer (2.2) and also to the other controllers (2.3). Additionally, it registers the application components with the Command Executor (2.1, if applicable).
2. The Executable Selector processes the SLA and decides on the executables that need deployment (2.2.1). The Executable Selector is different than any previously-used task allocation architecture in that it provides for the dynamic deployment and re-deployment of executables based on requirement violations and performance metrics that can be detected from other network controllers. Thus, applications can be re-deployed dynamically when requirement violations occur. In case of an initial deployment request, the deployments of all the application components are pending and thus all application components are selected. However, there is also the possibility of additive components of an application that is already deployed or of certain application components that need re-deployment according to the other network controllers. Moreover, the Executable Selector extracts and packs the application components along with their requirements from the SLA (2.2.2) and sends them to the Deployment Plan Finder (2.2.3, 2.2.4). In case of additive application components of an application that is already running, there are three alternative possible solutions that can take place:
  i) The Executable Selector sends only the new executables to the Deployment Plan Finder and the same network slice that has been previously provisioned to the application is used. This way the deployment plan includes only the deployments of the new executables.
  ii) The Executable Selector sends the new executables to the Deployment Plan Finder along with some of the executables that were already deployed due to preferential treatment that has to be given to new executables over executables that were already deployed. This way the deployment plan includes the deployment of the new executables along with re-deployment or migration of previously deployed executables.
  iii) The Executable Selector sends all the executables of the application to the Deployment Plan Finder (new and previously deployed) because solutions i) or ii) do not produce an acceptable deployment plan (including all the executables). This solution considers all the executables as newly submitted and the deployment plan can possibly include deployments, re-deployments and migrations. If this step fails to produce a deployment plan with all the executables, then slice reconfiguration is requested.
3. One of the other network controllers responds to the reception of the SLA and provisions an appropriate network slice to the specific application. Information about this slice is sent to the Controller Cooperation Coordinator which in turn sends it to the Network Topology Assembler (3, 4).
4. The Network Topology Assembler receives the network slice and reformats it into a format that is compatible with the internal algorithms of the Deployment Plan Finder (5.1). Then, the formatted representation of the network slice is sent to the Deployment Plan Finder. The type of reformatting will depend on the format which is used by the network controller which provides the input into the Network Topology Assembler and on the format chosen for the Deployment Plan Finder.
5. The Deployment Plan Finder, using input that includes the network slice, the application components and all the requirements, computes an optimized deployment plan that assigns all the executables to hardware resources inside the network slice (6.1).
6. If no deployment plan can be found based on the current network slice, a mechanism for further cooperation among the controllers is triggered so that the network slice can be reconfigured (6.2, 7). For example, extra nodes and links can be added by the network controller such that the reconfigured network slice includes increased hardware and network resources.
7. When the optimized deployment plan is computed, it is sent to the Deployment Plan Executor (6.2). This component translates the deployment plan (from the Deployment Plan Optimizer) or any application-related request (from the other network controllers, e.g., resize, migrate, etc.) to commands that can be input to the Command Executor (7.1).
8. The Command Executor receives commands related to the deployment of applications and executes them over the actual infrastructure (loop 7.2).

FIGS. 3A and 3B schematically illustrate the above-described components of a system according to an embodiment which employ a multi-layer-aware application component deployment logic. The core of step 6.1 of FIG. 3A is realized by a deployment optimization problem and a set of algorithms for solving it. The algorithms consist of the following steps:

1. Initially, all the application components are prioritized according to the importance of their role in the application. Priorities can be computed internally for each application component based on the strictness of their requirements. Alternatively, priorities can also be dictated by the application provider inside the SLA of the application. In contrast to the known approaches, which treat application requirements only as constraints or as a metric for their application placement problem, the approach according to an embodiment of the present invention establishes priority values based on the quantitative requirements that can be later regarded as weights for giving preferential treatment to executables with high-demand in resources.

2. The network slice provisioned to each application is turned into an undirected weighted graph which allows employing algorithms from the graph theory to explore deployment alternatives. The fact that each application does not have access to any computing node of the network infrastructure, but can only be deployed inside its own network slice advantageously enables a more greedy approach for satisfying the application requirements. This means that deployments can take place in all nodes (inside the slice) if such action is beneficial to the performance of the application. Prior to the present invention, such an approach was discouraged and not considered practical because it was understood as utilizing a lot of resources regardless of availability for other applications. However, when operating inside the network slice, it was surprisingly found that this greedy approach does not affect other applications. Additionally, even though deploying executables greedily could overflow the network slice, an IoT platform can request slice reconfiguration and adjustment so that each application is assigned the resources that it needs in order to have its requirements satisfied.

3. By treating the application components one by one based on priorities, and by considering the computing nodes that belong to the assigned network slice to be a set of items, the problem of application placement of the application components is reduced to an instance of the already known (non-deterministic polynomial-time hard (NP-Hard)) Optimal Subset Selection problem. Based on shortest path algorithms from the graph theory, a heuristic is introduced that produces a solution with a significantly higher degree of approximating the optimal solution than traditional task allocation algorithms (e.g., random, greedy, best fit, etc.). Because the related works reduce placement problems to instances of the Knapsack Problem, these works lead to the use of very different heuristics than in embodiments of the present invention.

4. The Controller Cooperation Coordinator, other than triggering the Deployment Plan Optimizer, also serves as an interface for other network controllers to apply changes in the applications. When that happens, in case of violations of requirements that are not visible in the application layer, a request is sent by another network controller to the Controller Cooperation Coordinator for either re-deployment or for execution of a certain task (e.g., duplicate instance of executable, increase reserved resources, etc.) that is determined or estimated to fix the issues. This is in contrast to the known approaches of the task deployment problem which do not consider solutions that could be initiated by controllers that operate in different layers.

According to an exemplary embodiment, the exact problem formulation and all the involved algorithms are described in the following.

The Deployment Plan Optimizer addresses the problem of executable (i.e., application component) placement based on the following assumptions:

1. All the executables are paired with priority values which define the order in which the executables are going to be deployed (as discussed below, these values can be generated automatically if they are not provided).

2. There can be quantitative requirements between two executables (e.g., the communication between executable1 and executable2 requires at least 10 Mbps of bandwidth). Each requirement is assumed to be associated with an executable and to refer to a higher priority executable. Because of the multi-layer collaboration, it is also possible to have a requirement between an application component and a network function or an application component and an application that runs on the client side (e.g., smartphone application).

3. All executables have requirements and at least one of them has requirements towards a client-side executable (end-user application).

4. Executables can be replicated and deployed multiple times in multiple data centers (if allowed by the provider).

Taking into account the assumptions, the problem is formulated as described in the following to deploy each executable, based on priority, in a set of data centers, such that the latency between executables that have a respective requirement is minimized.

The infrastructure slice that is provided by the network controller(s) to the application platform is considered to be a set C of I Cloud and edge data centers.

$$C=\{c_1,c_2,\ldots,c_I\}$$

The latency value of the shortest path between two data centers $c_1$ and $c_2$ is denoted as $Lat_{c_1,c_2}$.

Each application contains a set E of J executables and each executable has a set Q of $x_e$ hardware requirements.

$$E=\{e_1,e_2,\ldots,e_J\}$$

$$Q=\{q_1,q_2,\ldots,q_{x_e}\}$$

Additionally, each executable can be replicated k times and be deployed on each one of the data centers of C.

$$f(e)=k, k\leq |C|$$

Every application is accompanied by an SLA which includes, but is not limited to, a description of all the requirements of the application's executables. Each executable e has a set R of $M_e$ latency requirements and each requirement is related to another executable.

$$R=\{r_1,r_2,\ldots,r_{M_e}\}$$

There is also the case that a certain executable has requirements on the user equipment (requirement towards applications that run on the client side). Such requirements are converted to requirements towards the edge data centers of the set C that are close to actual users of the client-side application. Such information can also be retrieved by the other network controllers.

Based on the priorities of the executables that are considered as the order of deployment dictated by the SLA, the optimization goal is two-fold:
1. Latency minimization of the requirements.
2. Minimization of the replications k of each executable which has the ultimate goal of saving space for executables that will be deployed afterwards, thus helping to satisfy their latency minimization of the requirements and effecting improvements in computational performance and storage.

Therefore, the problem is formulated as follows: Starting from the highest priority executable e, the goal is to find the set $T \subseteq C$ such that deploying e on all data centers of T results in the minimum latency of the requirements of e. Additionally, for the minimum latency that can be achieved, it is also desirable to have the minimum replications of e (i.e., cardinality of the set T). Minimum cardinality of T:

$$|T| \text{ with } T \subseteq C \text{ and } T=\{c_1, c_2, \ldots, c_k\}$$

subject to:
i) The minimum value of the summary of the latencies towards each one of the requirements of executable e.

$$\sum_{r_1}^{r_M} Lat_{c_a, c_b} \quad (I)$$

with $c_a \in C$ being the host data center of the executable of the requirement r, and $c_b \in T$ being the data center that has the minimum latency from $c_a$.

$$c_b \in T \ni Lat_{c_a, c_b} = \min\{Lat_{c_a, c_1}, \ldots, Lat_{c_a, c_p}\}$$

ii) The following hardware constraints: Each hardware requirement $q_1, q_2, \ldots, q_{x_e}$ of the executable e (e.g., CPU, RAM, etc.) is subject to the remaining available hardware resources $N_1, N_2, \ldots, N_x$ of the data center (e.g., CPU, RAM, etc.), and therefore the following constraints have to be met:

$$\forall i \in \{1, 2, \ldots, x_e\} \; q_i \leq N_i$$

wherein the notation $N_i$ of a data center c reflects its current availability regarding a specific hardware resource. $N_i$ is computed as the overall capacity of the hardware resource of the data center minus the summary the resources of the same type that have been reserved due to executables hosted on the data center. For instance, assuming that N stands for RAM and that the executables $e_1, e_2, \ldots, e_J$ are deployed on a data center c.

$$N = RAM_c - \sum_{i=1}^{J} RAM_{e_i}$$

with $RAM_c$ being the RAM capacity of the data center c and $RAM_{e_i}$ being the RAM requirement of the executable $e_i$.

There is also a possibility that replication is not allowed for certain executables, for example, as is the case where executables need to gather information from many sources and process it all together (e.g., for averaging, statistics, billing purposes). For the executables that cannot be replicated there is only one element in the set T. In this case, the goal is to deploy the executable e on the data center $c_b$ that minimizes the value of the maximum latency among all the latencies of the requirements. $c_r$ denotes the data center that hosts the executable of a requirement r.

$$Lat_{c_r, c_b} = \max\{Lat_{c_{r_1}, c_b}, \ldots, Lat_{c_{r_M}, c_b}\}$$

The formulated problem can be reduced to an instance of the Optimal Subset Selection problem, with the set of data centers C corresponding to the set of items whose optimal subset needs to be found, and the set of constraints being the latency-minimization and the hardware constraints. Therefore, the problem is also NP-hard and, according to an embodiment of the present invention, a heuristic has been developed which achieves a near-optimal solution.

The deployment heuristic algorithm works according to an embodiment by the following steps and the following pseudocode as Algorithm 1:

1. All the executables are sorted in ascending order based on their priority.
2. The graph of the network slice is created with data centers as vertices and the latencies among the data centers as edges.
3. For each executable, each requirement is processed separately (the parsing order of the requirements is irrelevant).
4. Based on a shortest path algorithm applied on the graph, the data center that serves the requirement with minimum latency and satisfies the hardware constraints of the executable is found.
5. If the executable does not reside in the data center from a previous iteration (i.e., has been selected for deployment in a previous iteration), then this data center is chosen for deployment (i.e., added to the set of selected data centers).
6. In case of executables that cannot be replicated, the maximum latency among all the latencies of the requirements is found as if the executable was deployed on every data center (again, with the use of a shortest path algorithm on the graph).
7. The data center for which the minimum value of the maximum latency occurs is chosen for deployment.

/*
DESCRIPTION: heuristic for finding an approximation of the optimal solution for deploying executables in a set of data centers.
INPUT:
8. EXECUTABLES: a list of the executables of an application. Each executable includes its own requirements.
9. NETWORK SLICE: a slice of resources provisioned to the specific application.
OUTPUT:
1. DEPLOYMENT_PLAN: a list of deployments that assigns one or more instances of each executable to data centers of the network slice.

*/
/*the prioritization process is performed only if no priorities are provided and is described by Algorithm 2.
ADD_PRIORITIES (EXECUTABLES);
/*ascending order*/
SORT_BY_PRIORITY (EXECUTABLES);
DEPLOYMENT_PLAN;
FOR EACH EXECUTABLE e: E {
  IF (REPLICATION_IS_ALLOWED (e)) {
    FOR EACH LATENCY_REQUIREMENT r: R {
      TARGET_DATACENTER=GET_DATACENTER_FROM (r);

```
      IF (AVAILABLE_HARDWARE (TARGET_DATACENTER)≥
    REQUIRED_HARDWARE (e)) {
/*if executable e has not been deployed on TARGET _DATACENTER */
    IF (EXECUTABLE_NOT_ON_DATACENTER (e, TARGET _DATACENTER) {
      DEPLOYMENT_PLAN.ADD (e, TARGET_DATACENTER);
    }
  }
ELSE {
/*network graph has vertices that represent the data centers of the slice and undirected
weighted edges that represent the links. The weights of the edges are the values of the
latencies of the links respectively.*/
    NETWORK_GRAPH=CREATE_NETWORK_GRAPH (NETWORK_SLICE);
/*TARGET_DATACENTER acquires the value of the data center of the shortest path.
Return null when no data center is found.*/
    WHILE (TARGET_DATACENTER=FIND_SHORTEST_PATH
(GET_DATACENTER_FROM (r), NETWORK_GRAPH)) {
    IF (AVAILABLE_HARDWARE (TARGET _DATACENTER)≥
REQUIRED_HARDWARE (e)) {
/*if executable e has not been deployed on TARGET _DATACENTER */
    IF (EXECUTABLE_NOT_ON_DATACENTER (e, TARGET _DATACENTER) {
      DEPLOYMENT_PLAN.ADD (e, TARGET _DATACENTER);
      BREAK;
    }
  }
ELSE {
/*remove vertex from graph but maintain connectivity among other vertices*/
    REMOVE_VERTEX (TARGET _DATACENTER, NETWORK_GRAPH);
        }
      }
    }
  }
}
/*if replication is not allowed*/
  ELSE {
    STRING TARGET_DATACENTER;
    DOUBLE MIN_MAX_LATENCY;
    FOR EACH DATACENTER c: C {
      IF (AVAILABLE_HARDWARE (c) ≥ REQUIRED_HARDWARE
(j)) {
      DOUBLE MAX_LATENCY;
      FOR EACH LATENCY_REQUIREMENT r: R {
/* GET_WEIGHT represents the weight of the shortest path between the two vertices of the
parameters.*/
    IF (GET_WEIGHT (FIND_SHORTEST_PATH (c, GET_DATACENTER_FROM
(r), NETWORK_GRAPH)) > MAX_LATENCY) {
      MAX_LATENCY=GET_WEIGHT (FIND_SHORTEST_PATH (c,
    GET_DATACENTER_FROM (r), NETWORK_GRAPH));
        }
      }
    IF (MAX_LATENCY < MIN_MAX_LATENCY) {
    MIN_MAX_LATENCY=MAX_LATENCY;
    TARGET_DATACENTER=c;
      }
    }
  }
DEPLOYMENT_PLAN.ADD (c, TARGET_DATACENTER);
  }
}
```

Priorities can either be enclosed in the SLA by the application provider or be calculated based on the SLA. According to an embodiment of the present invention, a heuristic has been developed for generating the priority values where they are not provided. This prioritization heuristic algorithm works with the following steps and the following pseudocode as Algorithm 2:

1. All the requirements are checked in case there are duplicates. If there are, the requirement with the most critical value is kept, the others are discarded.
2. The graph of the executables is created having the executables as vertices and the quantitative bandwidth requirements as weighted edges.
3. First priority is assigned to the executable with the highest bandwidth requirement towards the user equipment.
4. Based on the shortest path, all executables are prioritized according to the value of their bandwidth requirement so that high bandwidth demand gets high priority.

```
/*
```

DESCRIPTION: an algorithm that assigns priority values to all the executables of an application based on their bandwidth requirements.

INPUT:

1) EXECUTABLES a list of the executables of an application. Each executable includes its own requirements.

OUTPUT:

1) EXECUTABLES a list of the executables of an application along with their priority values.

```
*/
ADD_PRIORITIES (EXECUTABLES) {
/*remove requirements that appear more than once. Always keep the requirement with the
more critical value.*/
REMOVE_DUPLICATE_REQUIREMENTS (EXECUTABLES);
/*network graph has vertices that represent the executables and undirected weighted edges
that represent bandwidth requirements. The weights of the edges are the values of the
bandwidth requirements respectively.*/
NETWORK_GRAPH=CREATE_NETWORK_GRAPH (EXECUTABLES);
/*the goal is to give priority to the executable with the higher demand in bandwidth. The
weights have to be reversed so that a shortest path algorithm will find the executable with the
highest bandwidth requirement first.*/
NETWORK_GRAPH=REVERSE_WEIGHTS (NETWORK_GRAPH); [wherein
REVERSE_WEIGHTS converts all the weights of the graph so that the minimum value
becomes maximum and the maximum becomes minimum. All other weights are changed
accordingly (e.g. value = maximum_value - value).]
/*first priorities are given to the executables with requirements towards the UE (User
Equipment)*/
STARTVERTEX=UE;
PRIORITY_VALUE=1;
/*the executable of the shortest path i.e. the executable with the highest bandwidth
requirement towards UE. Return null when no executable is found.*/
EXECUTABLE=FIND_SHORTEST_PATH (START_VERTEX, NETWORK_GRAPH);
WHILE (EXECUTABLE != NULL) {
   SET_PRIORITY (EXECUTABLE, PRIORITY_VALUE++);
/*remove vertex from graph but maintain connectivity among other vertices*/
   REMOVE_VERTEX (EXECUTABLE, NETWORK_GRAPH);
   EXECUTABLE=FIND_SHORTEST_PATH (START_VERTEX,
NETWORK_GRAPH);
   IF (EXECUTABLE == NULL) {
/*find the executable with the maximum bandwidth requirement among the executables that
have not yet been assigned with a priority value*/
   EXECUTABLE =FIND_MAX_BANDWIDTH (EXECUTABLES);
/*add edge from START_VERTEX to EXECUTABLE on the NETWORK_GRAPH*/
   ADD_EDGE (START_VERTEX, EXECUTABLE, NETWORK_GRAPH);
   EXECUTABLE=FIND_SHORTEST_PATH (START_VERTEX,
NETWORK_GRAPH);
   }
}
/*direct all requirements from low priority executable to high priority executable*/
FOR EACH EXECUTABLE e: E {
   FOR EACH LATENCY_REQUIREMENT r: R {
      If (e.PRORITY < r.EXECUTABLE.PRIORITY) {
/*delete requirement from the executable e and add it to the executable of the requirement r.
The target of the requirement becomes the executable e*/
            REVERSE_REQUIREMENT (e, r);
      }
   }
}
}
```

Figure 4:
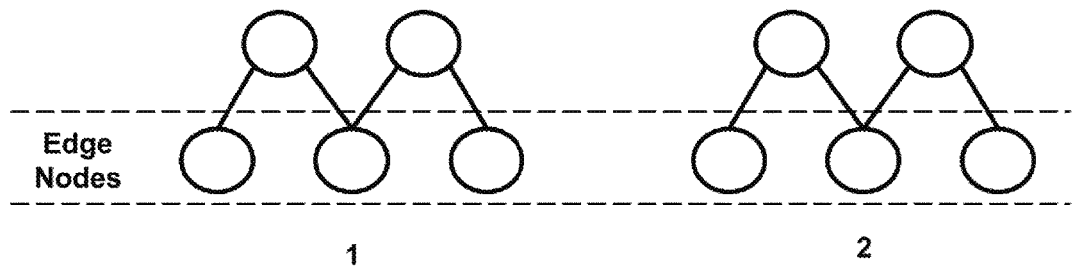
FIG. 4 shows two schematic network graphs with network 1 on the left side not having multi-layer cooperation and network 2 on the right side having multi-layer cooperation.

Referring to FIGS. 4-9, different scenarios illustrate common deployment differences induced by the IoT platform according to an embodiment of the present invention. FIG. 4 shows simplified network graphs with network 1 on the left representing a network without multi-layer cooperation and network 2 on the right representing a network with multi-layer cooperation in accordance with an embodiment of the present invention. FIGS. 5-9 then illustrate simplified examples of what could happen with and without multi-layer cooperation on these networks, in each case with network 1 on the left and network 2 on the right, as in FIG. 4. It is assumed that each computing node can host one executable and that the goal is to achieve minimum latency (hops). As shown in FIG. 4, the resources are initially considered as a network graph of nodes and edges (nodes represent data centers and edges represent physical links).

According to FIG. 5, an executable A is a submitted with requirement towards a client-side application. With multi-layer cooperation, due to radio access network information, the location of client-side application users is known and thus the deployment takes place close to the executable's requirement. Without multi-layer cooperation the location of client-side application users cannot be found and therefore, to achieve minimum latency, the deployment takes place in all edge nodes.

According to FIG. 6, an executable B with a requirement towards the executable A needs deployment. The location of executable A can be found in both cases and the deployment of executable B takes place as close as possible to the executable's requirement.

According to FIG. 7, an executable C with a requirement towards a network function needs deployment. With multi-layer cooperation, due to core network information, the location of network functions is known and thus the deployment takes close to the executable's requirement. Without multi-layer cooperation, this requirement cannot be met. Deployments take into account requirements to other executables. If the details of the network function are not known, a network function-aware deployment cannot be performed.

According to FIG. 8, an executable D with a requirement towards the executable C needs deployment. With multi-layer cooperation, the location of executable C is known and thus the deployment takes place close to the executable's requirement. Without multi-layer cooperation, is possible that the executable C will not even be deployed due to the prior steps having consumed too many resources.

According to FIG. 9, an executable E with requirements towards executables B and C needs deployment. With multi-layer cooperation, additional resources can be requested and, if the request is addressed by another network controller, the deployment can take place in a new computing node. Without multi-layer cooperation, no additional resources can be requested and executable E cannot be deployed.

According to an embodiment, the present invention offers the following advantages:
1. Higher degree of fulfillment of application requirements.
2. Reduced number of application requirement violations.
3. Low latency responses for end-user applications.
4. Addition of components in the architecture of the application platform controller which enable the dynamic collaboration with the network controllers during the application deployment process.
5. Usage of this extended application platform architecture in order to involve the following aspects/steps in the computation and execution of an optimized application deployment plan:
 i) Application-specific network slice (re-)allocation.
 ii) Collaborative application slice reconfiguration based on the resources required for achieving optimal deployment (according to a cost model).
 iii) Identifying location of application requirements towards components that operate on different layers than the application (e.g., virtualized or physical network functions and client-side applications).
 iv) Dynamic detection of application requirement violations related to network metrics (e.g., bandwidth, throughput, etc.).
 v) Requesting function realization that has been computed to improve application performance (e.g., application migrations, resource adjustments, deploying additional network functions, etc.).

According to an embodiment, a method for deploying application components to Cloud and edge IT resources comprises the steps of:
1. An application platform controller which includes components for interacting with network controllers is provided, in addition to the (standard) components for the computation and execution of optimal deployment plans (of customer application components).
2. The submission of application components (along with a SLA that includes the requirements of the application components) to the application controller, the request of a network slice for those components from the network controllers, and the per component computation of an optimal deployment plan by:
 i) Deploying components sequentially (based on priorities).
 ii) Deploying as many replicas of each component as required for best satisfying its requirement based on a customizable optimization algorithm, while requesting network slice adjustments from the network controllers if the requirements cannot be satisfied otherwise.
 iii) Deploying components to edge sites based on network controller information about existing registrations of application users to the access network of the edge sites.
 iv) Informing network controllers about potential inability to satisfy the requirements on application layer.

According to an embodiment, the present invention can be utilized as part of the IoT Service Enabler which is a platform for automated network management and control, capable of being used for Mobile Edge Computing, or could be used as the main controller for application deployment on Cloud and Edge computing nodes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for deploying application components to Information Technology (IT) resources using an application platform controller, the method comprising:
 receiving the application components and a Service Level Agreement (SLA) including requirements of each of the application components for an application to be deployed;
 requesting a network slice for the application components from a network controller;
 assigning priority values to the application components defining an order in which the application components are planned to be deployed;
 computing a deployment plan for the application components, wherein the network controller is notified and the network slice is reconfigured based on a determination that no deployment plan which meets the requirements is possible using the requested network slice; and
 deploying the application components sequentially, using the priority values, to host sites of the IT resources using information from the network controller including existing registrations of users of the application to an access network of the host sites such that replicas of each respective one of the application components are provided at the host sites which provide a minimum latency with respect to a location of the users,
 wherein the priority values are calculated based on the SLA by:
 creating a graph having the application components as vertices and quantitative bandwidth requirements as weighted edges; and
 assigning the priority values to the application components based on shortest paths according to respective values of the bandwidth requirements such that the application components having a higher bandwidth requirement toward a user equipment of the user are given higher priority.

2. The method according to claim 1, wherein the network slice is represented as a graph including the host sites as vertices, and wherein a shortest path algorithm is applied to the graph so as to locate one or more of the host sites which provides the minimum latency.

3. The method according to claim 1, further comprising:
determining a maximum latency among latencies for all of the host sites for an application component that cannot be replicated; and
choosing one of the host sites for deployment of the application component that cannot be replicated for which a minimum value of the maximum latency occurs.

4. The method according to claim 1, further comprising deploying at least one of the application components that has a requirement toward a network function.

5. The method according to claim 4, further comprising deploying at least one of the application component that has a requirement toward the at least one of the application components that has the requirement toward the network function.

6. The method according to claim 5, further comprising:
deploying at least one further one of the application components that has the requirement toward the at least one of the application components that has the requirement toward the network function and a requirement toward another one of the application components; and
requesting more of the IT resources to deploy the at least one further one of the application components.

7. The method according to claim 1, wherein the host sites include cloud sites, edge sites or both.

8. An application platform controller, comprising one or more processors which, alone or in combination, are configured to provide for execution of the following steps:
receiving the application components and a Service Level Agreement (SLA) including requirements of each of the application components for an application to be deployed;
requesting a network slice for the application components from a network controller;
assigning priority values to the application components defining an order in which the application components are planned to be deployed;
computing a deployment plan for the application components, wherein the network controller is notified and the network slice is reconfigured based on a determination that no deployment plan which meets the requirements is possible using the requested network slice; and
deploying the application components sequentially, using the priority values, to host sites of the IT resources using information from the network controller including existing registrations of users of the application to an access network of the host sites such that replicas of each respective one of the application components are provided at the host sites which provide a minimum latency with respect to a location of the users,
wherein the priority values are calculated based on the SLA in the application platform controller by:
creating a graph having the application components as vertices and quantitative bandwidth requirements as weighted edges; and
assigning the priority values to the application components based on shortest paths according to respective values of the bandwidth requirements such that the application components having a higher bandwidth requirement toward a user equipment of the user are given higher priority.

9. The application platform controller according to claim 8, wherein the network slice is represented as a graph including the host sites as vertices, and wherein a shortest path algorithm is applied to the graph so as to locate one or more of the host sites which provides the minimum latency.

10. The application platform controller according to claim 8, wherein the one or more processors, alone or in combination, are further configured to perform the following steps:
determining a maximum latency among latencies for all of the host sites for an application component that cannot be replicated; and
choosing one of the host sites for deployment of the application component that cannot be replicated for which a minimum value of the maximum latency occurs.

11. The application platform controller according to claim 8, wherein the one or more processors, alone or in combination, are further configured to perform the following steps:
deploying at least one of the application components that has a requirement toward a network function; and
deploying at least one of the application component that has a requirement toward the at least one of the application components that has the requirement toward the network function.

12. The application platform controller according to claim 8, wherein the one or more processors, alone or in combination, are further configured to perform the following steps:
deploying at least one further one of the application components that has the requirement toward the at least one of the application components that has the requirement toward the network function and a requirement toward another one of the application components; and
requesting more of the IT resources to deploy the at least one further one of the application components.

13. The method according to claim 1, wherein the application platform controller is a controller of an Internet of Things (IoT) platform, and wherein the host sites include cloud sites, edge sites or both.

* * * * *